(12) United States Patent
Huh et al.

(10) Patent No.: US 12,374,779 B2
(45) Date of Patent: Jul. 29, 2025

(54) ANTENNA LAMINATE AND DISPLAY DEVICE INCLUDING THE SAME

(71) Applicant: DONGWOO FINE-CHEM CO., LTD., Jeollabuk-do (KR)

(72) Inventors: Yoon Ho Huh, Seoul (KR); Jong Min Kim, Gyeonggi-do (KR); Young Jun Lee, Seoul (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 271 days.

(21) Appl. No.: 17/974,801

(22) Filed: Oct. 27, 2022

(65) Prior Publication Data

US 2023/0049386 A1 Feb. 16, 2023

Related U.S. Application Data

(63) Continuation of application No. PCT/KR2021/004489, filed on Apr. 9, 2021.

(30) Foreign Application Priority Data

Apr. 29, 2020 (KR) ........................ 10-2020-0052674

(51) Int. Cl.
*H01Q 1/24* (2006.01)
*H01Q 1/48* (2006.01)
*H01Q 9/04* (2006.01)

(52) U.S. Cl.
CPC ............... *H01Q 1/243* (2013.01); *H01Q 1/48* (2013.01); *H01Q 9/0407* (2013.01)

(58) Field of Classification Search
CPC ........ H01Q 1/243; H01Q 1/48; H01Q 9/0407; H01Q 1/38
See application file for complete search history.

(56) References Cited

U.S. PATENT DOCUMENTS

| 8,585,455 B1* | 11/2013 | Cok ..................... G02F 1/13338 313/506 |
| 2012/0193770 A1* | 8/2012 | Yamada ................ H01L 23/552 257/659 |
| 2017/0287992 A1* | 10/2017 | Kwak ................... G06F 1/1637 |
| 2021/0103354 A1* | 4/2021 | Kim ..................... G06F 1/1643 |

FOREIGN PATENT DOCUMENTS

| CN | 107241465 A | 10/2017 |
| CN | 214589239 U | 11/2021 |
| JP | 2019-208147 A | 12/2019 |

(Continued)

OTHER PUBLICATIONS

International Search Report for PCT/KR2021/004489 mailed on Sep. 18, 2017.

(Continued)

*Primary Examiner* — Dieu Hien T Duong
(74) *Attorney, Agent, or Firm* — The PL Law Group, PLLC (57) ABSTRACT

An antenna laminate according to an embodiment may include a display panel which includes an electrode structure, a dielectric layer disposed on the display panel, an antenna conductive layer disposed on the dielectric layer, and a lower ground layer disposed on a lower side of the display panel and having a lower resistance than the display panel.

8 Claims, 4 Drawing Sheets

(56) References Cited

FOREIGN PATENT DOCUMENTS

| | | |
|---|---|---|
| KR | 10-2003-0095557 A | 12/2003 |
| KR | 10-2013-0062752 A | 6/2013 |
| KR | 10-2016-0137315 A | 11/2016 |
| KR | 10-1962819 B1 | 3/2019 |
| KR | 10-2019-0044360 A | 4/2019 |
| KR | 10-2031203 B1 | 10/2019 |
| KR | 10-2020-0009206 A | 1/2020 |
| KR | 10-2089458 B1 | 3/2020 |
| KR | 10-2092640 B1 | 4/2020 |
| KR | 10-2099830 B1 | 4/2020 |

OTHER PUBLICATIONS

Office action issued on Oct. 29, 2021 from Korean Patent Office in a counterpart Korean Patent Application No. 10-2020-0052674 (all the cited references are listed in this IDS.) (English translation is also submitted herewith.).

\* cited by examiner

ANTENNA LAMINATE AND DISPLAY DEVICE INCLUDING THE SAME

CROSS-REFERENCE TO RELATED APPLICATION AND CLAIM OF PRIORITY

The present application is a continuation of application to International Application No. PCT/KR2021/004489 with an International Filing Date of Apr. 9, 2021, which claims the benefit of Korean Patent Applications No. 10-2020-0052674 filed on Apr. 29, 2020 at the Korean Intellectual Property Office, the disclosures of which are incorporated by reference herein in their entirety.

BACKGROUND

1. Field

The present invention relates to an antenna laminate and a display device including the same.

2. Description of the Related Art

Recently, according to development of the information-oriented society, wireless communication techniques such as Wi-Fi, Bluetooth, and the like are implemented, for example, in a form of smartphones by combining with display devices. In this case, an antenna may be coupled to the display device to perform a communication function.

Recently, with mobile communication techniques becoming more advanced, it is necessary for an antenna for performing communication in ultra-high frequency bands to be coupled to the display device. In addition, as thin, high-transparent, and high-resolution display devices such as a transparent display and a flexible display have been recently developed, it is necessary to develop an antenna so as to have improved transparency and flexibility.

As a screen of the display device is increased, the trends show that a space or area for the bezel part or the light-shielding part is decreasing. In this case, a space or area in which the antenna can be embedded is also limited, and thereby, a radiator included in the antenna for transmittance and reception of signals may be overlapped with a display region of the display device. Accordingly, an image of the display device may be hidden by the radiator of the antenna, or the radiator may be viewed by a user, thereby causing a deterioration in image quality.

Therefore, an antenna design for preventing the radiator from being viewed by the user, and implementing high-frequency communication with a desired antenna gain in the limited space is required.

SUMMARY

It is an object of the present invention to provide an antenna laminate and a display device including the same.

To achieve the above object, the following technical solutions are adopted in the present invention.

1. An antenna laminate including: a display panel which includes an electrode structure; a dielectric layer disposed on the display panel; an antenna conductive layer disposed on the dielectric layer; and a lower ground layer disposed on a lower side of the display panel and having a lower resistance than the display panel.

2. The antenna laminate according to the above 1, further including: a lower dielectric layer disposed between the display panel and the lower ground layer.

3. The antenna laminate according to the above 2, wherein the lower dielectric layer has a thickness of 50 µm to 800 µm.

4. The antenna laminate according to the above 1, wherein a distance between the electrode structure and the lower ground layer is 50 µm to 800 µm.

5. The antenna laminate according to the above 1, wherein the display panel has a resistance of 10 Ω/sq or less.

6. The antenna laminate according to the above 1, wherein the lower ground layer has a resistance of 0.5 Ω/sq or less.

7. The antenna laminate according to the above 1, further including: a first adhesive layer disposed between the antenna conductive layer and the dielectric layer; and a second adhesive layer disposed between the dielectric layer and the display panel.

8. The antenna laminate according to the above 1, wherein the antenna conductive layer includes a radiator and a transmission line connected to the radiator, and the lower ground layer is at least partially overlapped with the radiator.

9. A display device including the antenna laminate according to the embodiments.

10. The display device according to the above 9, wherein the lower ground layer is provided as one of an SUS plate, a heat dissipation sheet, a digitizer, an electromagnetic shielding layer, a pressure sensor, and a fingerprint sensor of the display device.

In the antenna laminate according to an embodiment, a dielectric layer may be formed on the display panel, an antenna conductive layer may be formed on the dielectric layer, and a lower ground layer may be formed on a lower side of the display panel. The display panel and the lower ground layer may form a ground composite to improve signal characteristics of the antenna.

The lower ground layer may be provided as a functional layer for implementing smart functions of the display device. Accordingly, it is possible to improve space utilization and achieve a demand for reducing a thickness of the antenna.

The lower ground layer may include metal having a lower resistance than the display panel. Thereby, the lower ground layer may supplement and improve the performance of the display panel as a ground layer thereof. Accordingly, the signal characteristics of the antenna may be improved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

An antenna laminate described herein includes a patch antenna or a microstrip antenna manufactured in a form of a transparent film, and for example, may be applied to communication devices for high frequency or ultra-high frequency (e.g., 3G, 4G, 5G or more) mobile communication, Wi-Fi, Bluetooth, near field communication (NFC), global positioning system (GPS) and the like.

Figure 1:
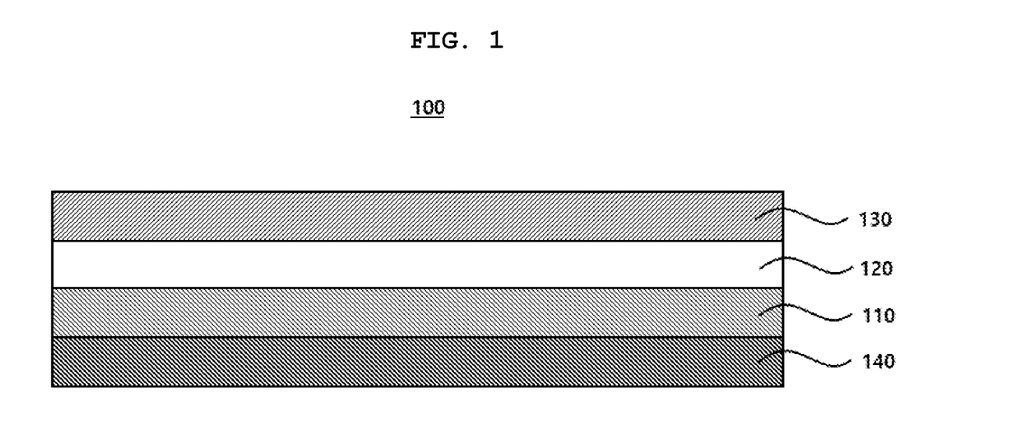
FIG. 1 is a schematic cross-sectional view illustrating an antenna laminate according to an embodiment.

FIG. 1 is a schematic cross-sectional view illustrating an antenna laminate according to an embodiment.

Referring to FIG. 1, an antenna laminate 100 according to an embodiment may include a display panel 110, a dielectric layer 120, an antenna conductive layer 130, and a lower ground layer 140.

The display panel 110 includes metal, a metal alloy, or metal oxide having a predetermined conductivity, and may be coupled to the antenna conductive layer 130 with the dielectric layer 120 interposed therebetween to form a capacitance or inductance. Thereby, vertical radiation characteristics may be implemented in the antenna laminate 100.

According to an embodiment, the display panel 110 may include a liquid crystal display (LCD) panel, a light emitting diode (LED) panel, an organic light emitting diode (OLED) panel, a quantum dot light emitting diode (QLED) panel and the like.

According to an embodiment, the display panel 110 (more specifically, an electrode structure 210 of FIG. 2) may be at least partially overlapped with the antenna conductive layer 130 in a thickness direction of the antenna laminate 100. Accordingly, the display panel 140 may be provided as a ground of the antenna conductive layer 130. For example, the antenna conductive layer 130 and the display panel 110 may be coupled with each other to transmit and receive antenna signals.

According to an embodiment, the display panel 110 (more specifically, the electrode structure 210 of FIG. 2) may be entirely overlapped with the antenna conductive layer 130. In this case, a coupling area between the display panel 110 and the antenna conductive layer 130 may be increased, and thereby gain and efficiency of the antenna may be increased.

According to an embodiment, the display panel 110 (more specifically, the electrode structure 210 of FIG. 2) may have a resistance of 10 Ω/sq or less. The display panel 110 may be formed by laminating several conductive layers in multiple layers for supplementing physical properties (e.g., adhesion, etc.).

The dielectric layer 120 may be disposed on the display panel 110. For example, the dielectric layer 120 may contact the display panel 110, or another member may be interposed between the dielectric layer 120 and the display panel 110.

The dielectric layer 120 may include an insulation material having a predetermined dielectric constant. According to an embodiment, the dielectric layer 120 may include an inorganic insulation material such as glass, silicon oxide, silicon nitride, or metal oxide, or an organic insulation material such as an epoxy resin, an acrylic resin, or an imide resin. The dielectric layer 120 may function as a film substrate on which the antenna conductive layer 130 is formed.

According to an embodiment, a transparent film may be provided as the dielectric layer 120. In this case, the transparent film may include a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acryl resin such as polymethyl (meth)acrylate, polyethyl (meth)acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; an amide resin such as nylon, aromatic polyamide; an imide resin; a polyether sulfonic resin; a sulfonic resin; a polyether ether ketone resin; a polyphenylene sulfide resin; a vinylalcohol resin; a vinylidene chloride resin; a vinylbutyral resin; an allylate resin; a polyoxymethylene resin; a thermoplastic resin such as an epoxy resin and the like. These compounds may be used alone or in combination of two or more thereof. In addition, a transparent film made of a thermosetting resin or an ultraviolet curable resin such as (meth)acrylate, urethane, acrylic urethane, epoxy, silicone, and the like may be used as the dielectric layer 120.

According to an embodiment, an adhesive film such as an optically clear adhesive (OCA), or an optically clear resin (OCR), and the like may also be included in the dielectric layer 120.

According to an embodiment, the dielectric layer 120 may be formed in a substantial single layer, or may be formed in a multilayer structure of two or more layers.

Capacitance or inductance may be generated between the antenna conductive layer 130 and/or the display panel 110 by the dielectric layer 120, thus to adjust a frequency band which can be driven or sensed by the antenna laminate 100. When the dielectric constant of the dielectric layer 120 exceeds about 12, a driving frequency is excessively reduced, such that driving of the antenna in a desired high frequency band may not be implemented. Therefore, according to an embodiment, the dielectric constant of the dielectric layer 120 may be adjusted in a range of about 1.5 to 12, and preferably about 2 to 12.

According to an embodiment, an encapsulation layer 220 of the display panel 110, which will be described below with reference to FIG. 2, may be provided as the dielectric layer 120.

According to an embodiment, the dielectric layer 120 may have a thickness of 100 μm to 250 μm. When the thickness of the dielectric layer 120 is less than 100 μm, a distance between the antenna conductive layer 130 and the display panel 110 may be excessively close. In this case, the gain and efficiency of the antenna may be decreased. In addition, when the thickness of the dielectric layer 120 exceeds 250 μm, flexibility characteristics may be deteriorated due to an increase in the thickness of the antenna laminate 100. Preferably, the dielectric layer 120 has a thickness of 150 μm to 250 μm, and in this case, the gain and efficiency of the antenna may be improved to 5 dB or more and 60% or more, respectively.

The antenna conductive layer 130 may be disposed on the dielectric layer 120. For example, the antenna conductive layer 130 may contact the dielectric layer 120, or another member may be interposed between the antenna conductive layer 130 and the dielectric layer 120.

The antenna conductive layer 130 may include a low resistance metal such as silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy thereof. These may be used alone or in combination of two or more thereof. For example, the antenna conductive layer 130 may include silver (Ag) or a silver alloy (e.g., a silver-palladium-copper (APC) alloy) to implement a low resistance. As another example, the antenna conductive layer 130 may include copper (Cu) or a copper alloy (e.g., a copper-calcium (CuCa) alloy) in consideration of low resistance and fine line width patterning.

According to an embodiment, the antenna conductive layer 130 may include a transparent conductive oxide such as indium tin oxide (ITO), indium zinc oxide (IZO), indium zinc tin oxide (IZTO), zinc oxide (ZnOx), or copper oxide (CuO).

According to an embodiment, the antenna conductive layer 130 may include a lamination structure of a transparent conductive oxide layer and a metal layer, for example, may have a two-layer structure of transparent conductive oxide layer-metal layer or a three-layer structure of transparent conductive oxide layer-metal layer-transparent conductive oxide. In this case, resistance may be reduced to increase a signal transmission speed while improving flexible properties by the metal layer, and corrosion resistance and transparency may be improved by the transparent conductive oxide layer.

The lower ground layer 140 may be disposed on a lower side of the display panel 110. The lower ground layer 140 may form a ground composite with the display panel 110. The ground composite may act as a single ground layer to improve the performance (grounding performance) of the ground layer.

For example, when the grounding performance of the display panel 110 is insufficient, specifically, when radiation efficiency is insufficient due to electrical loss caused by a high resistance of the display panel 110, the lower ground layer 140 may supplement and increase the radiation efficiency to improve the grounding performance of the entire ground composite. Thereby, the gain and efficiency of the antenna may be improved.

The lower ground layer 140 may include metal, a metal alloy, or metal oxide having a lower resistance than the display panel 110. Therefore, when forming a ground composite together with the display panel 110, the grounding performance of the display panel 110 may be effectively improved.

According to an embodiment, the lower ground layer 140 may be at least partially overlapped with the antenna conductive layer 130 (more specifically, a radiator 310 of FIG. 3) in the thickness direction of the antenna laminate 100. Accordingly, the lower ground layer 140 may be provided as the ground of the antenna conductive layer 130. For example, the antenna conductive layer 130 and the lower ground layer 140 may be coupled with each other to transmit and receive the antenna signals. Due to such an overlapped structure, the grounding performance resulting from the lower ground layer 140 may be improved.

Figure 3:
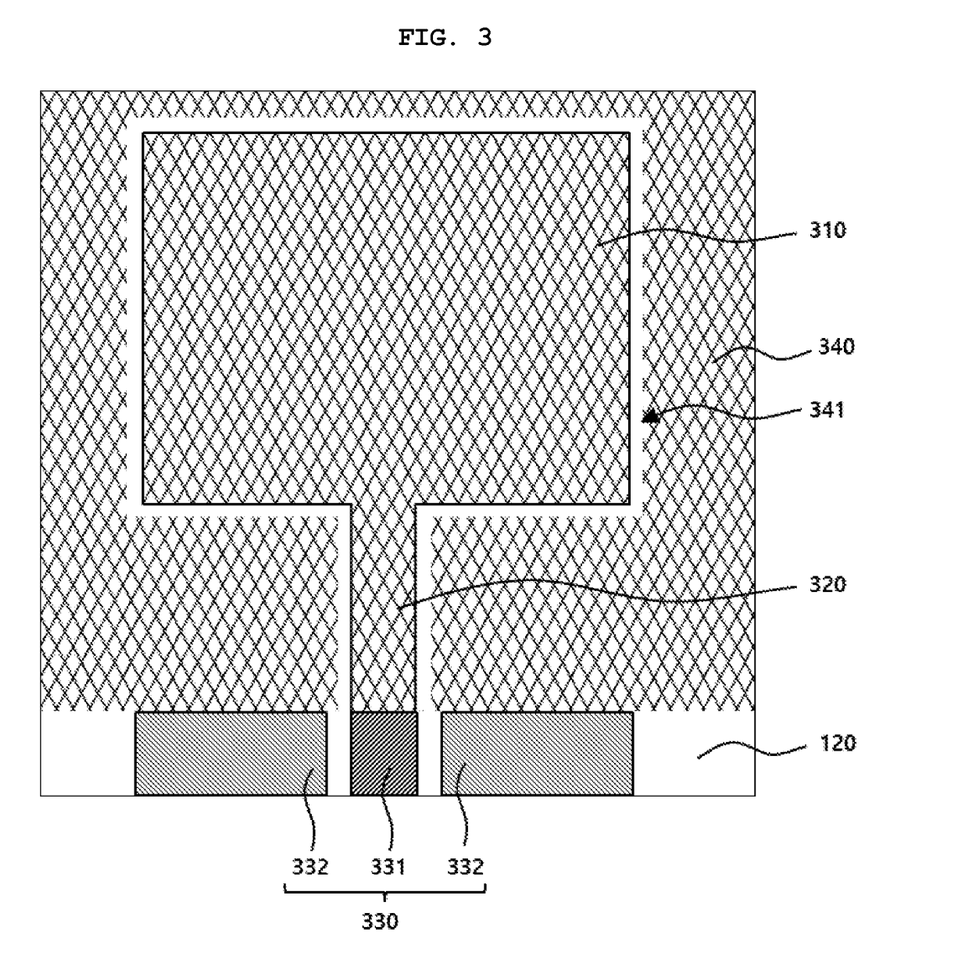
FIG. 3 is a schematic plan view illustrating an antenna conductive layer according to an embodiment.

According to an embodiment, the lower ground layer 140 may be entirely overlapped with the antenna conductive layer 130 (more specifically, the radiator 310 of FIG. 3). In this case, a coupling area between the lower ground layer 140 and the antenna conductive layer 130 may be increased, and thereby the gain and efficiency of the antenna may be increased.

According to an embodiment, the lower ground layer 140 may have a resistance of 0.5 Ω/sq or less. When the grounding performance of the display panel 110 is insufficient, in order to contribute to the improvement of the antenna performance, for example, antenna gain characteristics by the lower ground layer 140 as the ground composite, the lower ground layer 140 should have a resistance that satisfies at least 0.5 Ω/sq or less.

According to an embodiment, the lower ground layer 140 may be provided as a functional layer of a display device on which the antenna laminate 100 is mounted. In other words, the functional layer of the display device may be used as the lower ground layer 140. Herein, the functional layer is adapted to implement smart functions and may include a transparent electrode, whole metal, metal with a pattern, or the like according to the function. The functional layer may be, for example, a stainless steel (SUS) plate, a heat radiation sheet, a digitizer, an electromagnetic shielding layer, a pressure sensor, a fingerprint sensor, etc., and preferably, the heat radiation sheet. The heat dissipation sheet is a heat dissipation means provided in a form of a sheet to dissipate heat generated from the display device to an outside, and may be formed of a thermal conductive metal plate or the like.

Figure 2:
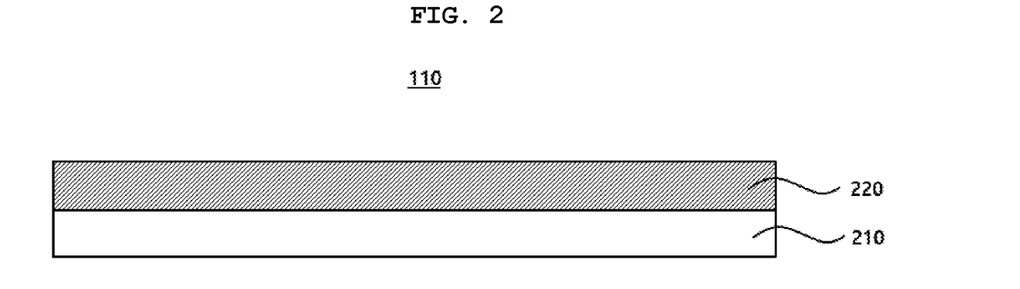
FIG. 2 is a schematic cross-sectional view illustrating a display panel according to an embodiment.

FIG. 2 is a schematic cross-sectional view illustrating a display panel according to an embodiment.

Referring to FIG. 2, the display panel 110 may include the electrode structure 210 and the encapsulation layer 220.

The electrode structure 210 may include gate electrodes, source electrodes, and drain electrodes included in a thin film transistor (TFT) array of the display panel. In addition, the electrode structure 210 may include pixel electrodes of the display panel.

For example, the gate electrode, the source electrode, the drain electrode, and the pixel electrode may include a low resistance metal such as silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy thereof. These may be used alone or in combination of two or more thereof.

According to an embodiment, the electrode structure 210 may include a transparent conductive oxide such as indium tin oxide (ITO), indium zinc oxide (IZO), indium zinc tin oxide (IZTO), zinc oxide (ZnOx), or copper oxide (CuO).

According to an embodiment, the electrode structure 210 may include a lamination structure of a transparent conductive oxide layer and a metal layer, for example, may have a two-layer structure of transparent conductive oxide layer-metal layer or a three-layer structure of transparent conductive oxide layer-metal layer-transparent conductive oxide. In this case, resistance may be reduced to increase a signal transmission speed while improving flexible properties by the metal layer, and corrosion resistance and transparency may be improved by the transparent conductive oxide layer.

The encapsulation layer 220 may include an inorganic insulation material, an organic insulation material, or an organic-inorganic hybrid film. The encapsulation layer 220 may be provided as a sealing layer for protecting the thin film transistor (TFT), the electrodes, and a display layer included in the display panel. According to an embodiment, the encapsulation layer 220 may be manufactured together as a component or member included in the display panel.

According to an embodiment, the electrode structure 210 may be provided as a ground layer forming the ground composite together with the lower ground layer 140.

According to an embodiment, the encapsulation layer 220 may be provided as the dielectric layer 120. In this case, the antenna conductive layer 130 may be disposed on the encapsulation layer 220 without additionally forming a separate dielectric layer. In addition, by forming a separate dielectric layer and disposing the antenna conductive layer 130 on the separate dielectric layer, the separate dielectric layer and the encapsulation layer 220 may function as one dielectric layer 120.

FIG. 3 is a schematic plan view illustrating an antenna conductive layer according to an embodiment.

Referring to FIG. 3, the antenna conductive layer 130 may include the radiator 310, a transmission line 320, and a pad electrode 330.

The radiator 310 may be formed in a mesh structure. For example, the radiator 310 may be formed in a mesh structure having an aperture ratio or transmittance of 70% or more. Thereby, the transmittance of the radiator 310 may be increased, and the flexibility of the antenna laminate 100 may be improved. Therefore, the antenna laminate 100 may be effectively applied to a flexible display device.

According to an embodiment, as shown in FIG. 3, the radiator 310 may be implemented in a rectangular shape. However, this is only an example, and there is no particular limitation on the shape of the radiator 310. That is, the radiator 310 may be implemented in various shapes such as a rhombus, circle and the like.

The radiator 310 may be electrically connected to the transmission line 320 to be supplied with a power through the transmission line 320.

The transmission line 320 may be disposed between the radiator 310 and the signal pad 331 of the pad electrode 330 to electrically connect the radiator 310 and the signal pad 331.

The transmission line 320 may be branched from a central portion of the radiator 310 to be connected to the signal pad 331.

According to an embodiment, the transmission line 320 may include substantially the same conductive material as the radiator 310. Further, the transmission line 320 may be provided as a substantial single member by integrally connecting with the radiator 310, or may be provided as a separate member from the radiator 310.

The transmission line 320 may be formed in a mesh structure having a shape substantially the same as or similar to that of the radiator 310.

The pad electrode 330 may include a signal pad 331 and ground pads 332.

The signal pad 331 may be connected to an end of the transmission line 320 to be electrically connected to the radiator 310 through the transmission line 320. Thereby, the signal pad 331 may electrically connect a driving circuit unit (such as an IC chip, etc.) with the radiator 310. For example, a printed circuit board such as a flexible printed circuit board (FPCB) may be adhered to the signal pad 331, and the driving circuit unit may be mounted on the flexible printed circuit board. Accordingly, the radiator 310 and the driving circuit may be electrically connected with each other.

The ground pad 332 may be disposed around the signal pad 331 so as to be electrically and physically separated from the signal pad 331. For example, a pair of ground pads 332 may be disposed to face each other with the signal pad 331 interposed therebetween.

According to an embodiment, the signal pad 331 and the ground pad 332 may be formed of a solid structure including the above-described low resistance metal or an alloy thereof to reduce a signal resistance. In this case, the signal pad 331 and the ground pad 332 may be formed in a multilayer structure including the above-described low resistance metal or an alloy layer thereof and the transparent conductive oxide layer.

According to an embodiment, the antenna conductive layer 130 may further include a dummy pattern 340.

The dummy pattern 340 may be arranged around the radiator 310 and the transmission line 320.

The dummy pattern 340 is formed in a mesh structure having a shape substantially the same as or similar to the radiator 310 and/or the transmission line 320, and may include the same metal as the radiator 310 and/or the transmission line 320. According to an embodiment, the dummy pattern 340 may be formed in a segmented mesh structure.

The dummy pattern 340 may be disposed so as to be electrically and physically separated from the radiator 310 and the transmission line 320. For example, a separation area 341 may be formed along side lines or edges of the radiator 310 and the transmission line 320 to separate the dummy pattern 340 from the radiator 310 and the transmission line 320.

As described above, by arranging the dummy pattern 340 having a mesh structure substantially the same as or similar to that of the radiator 310 and/or the transmission line 320 around the radiator 310 and the transmission line 320, it is possible to prevent the radiator 310 and the transmission line 320 from being viewed from a user of the display device on which the antenna laminate is mounted.

Meanwhile, for the convenience of description, only one antenna conductor (the radiator 310 and the transmission line 320) is shown in FIG. 3, but a plurality of antenna conductors may be arranged on the dielectric layer 120 in an array form.

Figure 4:
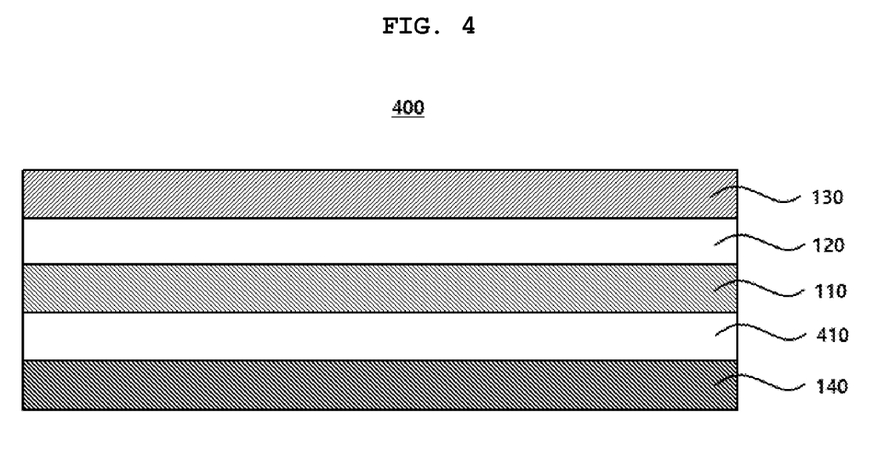
FIG. 4 is a schematic cross-sectional view illustrating an antenna laminate according to another embodiment.

FIG. 4 is a schematic cross-sectional view illustrating an antenna laminate according to another embodiment.

Referring to FIG. 4, an antenna laminate 400 according to another embodiment may include a display panel 110, a dielectric layer 120, an antenna conductive layer 130, a lower ground layer 140, and a lower dielectric layer 410. Herein, the display panel 110, the dielectric layer 120, the antenna conductive layer 130, and the lower ground layer 140 are the same as those of the antenna laminate described above with reference to FIGS. 1 to 3, therefore will not be described in detail.

The lower dielectric layer 410 may be disposed between the display panel 110 and the lower ground layer 140. For example, the lower dielectric layer 410 may contact the display panel 110 and the lower ground layer 140, and another member may be interposed between the lower dielectric layer 410 and the display panel 110 and/or between the lower dielectric layer 410 and the lower ground layer 140.

The lower dielectric layer 410 may include an insulation material having a predetermined dielectric constant. According to an embodiment, the lower dielectric layer 410 may include an inorganic insulation material such as glass, silicon oxide, silicon nitride, or metal oxide, or an organic insulation material such as an epoxy resin, an acrylic resin, or an imide resin.

According to an embodiment, a transparent film may be provided as the lower dielectric layer 410. In this case, the transparent film may include a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acryl resin such as polymethyl (meth)acrylate, polyethyl (meth)acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; an amide resin such as nylon, aromatic polyamide; an imide resin; a polyether sulfonic resin; a sulfonic resin; a polyether ether ketone resin; a polyphenylene sulfide resin; a vinylalcohol resin; a vinylidene chloride resin; a vinylbutyral resin; an allylate resin; a polyoxymethylene resin; a thermoplastic resin such as an epoxy resin and the like. These compounds may be used alone or in combination of two or more thereof. In addition, a transparent film made of a thermosetting resin or an ultraviolet curable resin such as (meth)acrylate, urethane, acrylic urethane, epoxy, silicone, and the like may be used as the lower dielectric layer 410.

According to an embodiment, an adhesive film such as an optically clear adhesive (OCA) or an optically clear resin (OCR) may also be included in the lower dielectric layer 410.

According to an embodiment, the lower dielectric layer 410 may be formed in a substantial single layer, or may be formed in a multilayer structure of two or more layers.

Capacitance or inductance may be generated between the display panel 110 and/or the lower ground layer 140 by the lower dielectric layer 410, thus to form a ground composite may be formed. A frequency band which can be driven or sensed by the antenna laminate 400 may be adjusted by the lower dielectric layer 410. When the dielectric constant of the lower dielectric layer 410 exceeds about 12, the driving frequency is excessively reduced, such that driving of the antenna in a desired high frequency band may not be implemented. Therefore, according to an embodiment, the dielectric constant of the lower dielectric layer 140 may be adjusted in a range of about 1.5 to 12, and preferably about 2 to 7.

According to an embodiment, the thickness of the lower dielectric layer 410 may be determined so that a distance between the electrode structure 210 of the display panel 110 and the lower ground layer 140 is 50 µm to 800 µm. When the distance between the electrode structure 210 and the lower ground layer 140 exceeds 800 µm, an effect of improving the grounding performance to be aimed due to the formation of the ground composite described above may not be substantially implemented even when the resistance of the lower ground layer 140 is low. Preferably, the distance between the electrode structure 210 and the lower ground layer 140 is 50 µm to 500 µm, and more preferably 50 µm to 300 µm. For example, the lower dielectric layer 410 may have a thickness of 50 µm to 800 µm, preferably 50 µm to 500 µm, and more preferably 50 µm to 300 µm.

Figure 5:
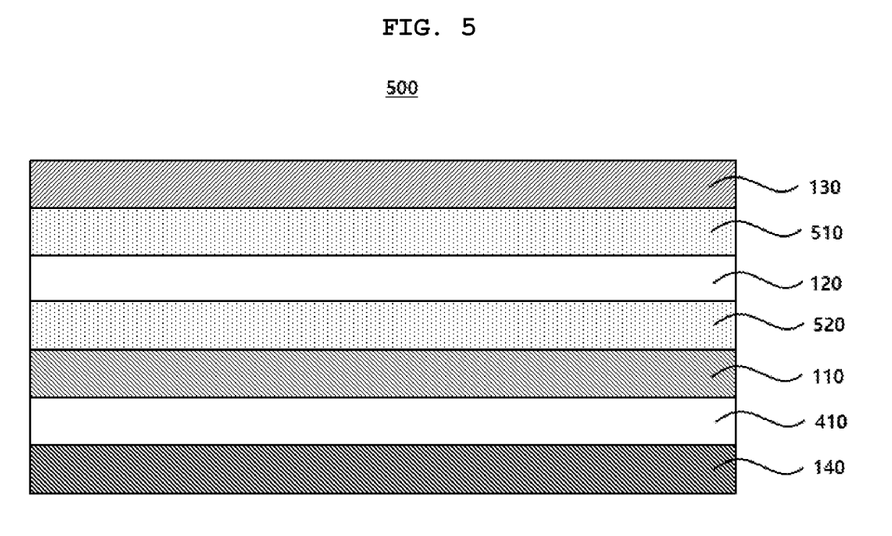
FIG. 5 is a schematic cross-sectional view illustrating an antenna laminate according to another embodiment.

FIG. 5 is a schematic cross-sectional view illustrating an antenna laminate according to another embodiment.

Referring to FIG. 5, an antenna laminate 500 according to another embodiment may include a display panel 110, a dielectric layer 120, an antenna conductive layer 130, a lower ground layer 140, a lower dielectric layer 410, a first adhesive layer 510, and a second adhesive layer 520. Herein, the display panel 110, the dielectric layer 120, the antenna conductive layer 130, and the lower ground layer 140 are the same as those of the antenna laminate described above with reference to FIGS. 1 to 3, and the lower dielectric layer 410 is the same as that of the antenna laminate described above with reference to FIG. 4, therefore will not be described in detail.

The first adhesive layer 510 may be disposed between the antenna conductive layer 130 and the dielectric layer 120, and the second adhesive layer 520 may be disposed between the dielectric layer 120 and the display panel 110.

The first adhesive layer 510 and the second adhesive layer 520 may include an adhesive film such as an optically clear adhesive (OCA), an optically clear resin (OCR) and the like.

According to an embodiment, the antenna conductive layer 130 and the display panel 110 may be electrically and physically separated from each other by the dielectric layer 120. In addition, the display panel 110 and the lower ground layer 140 may be connected to each other by a via or a contact penetrating through the dielectric layer 120.

According to an embodiment, the display panel 110 and the lower ground layer 140 may be electrically and physically separated from each other by the lower dielectric layer 410. Further, the display panel 110 and the lower ground layer 140 may be connected to each other by a via or a contact penetrating the lower dielectric layer 410.

Figure 6:
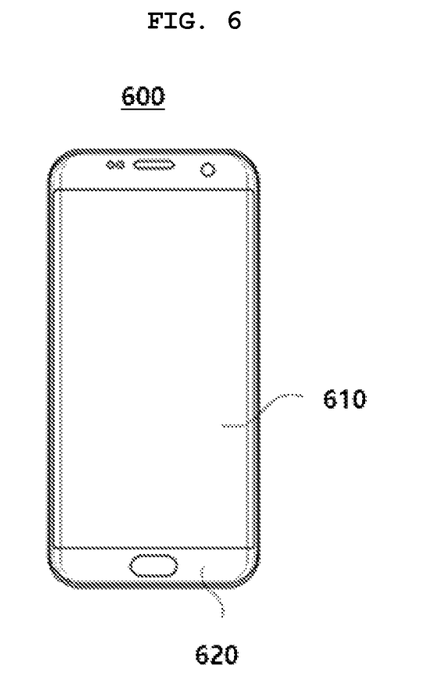
FIG. 6 is a schematic plan view illustrating a display device according to an embodiment.

FIG. 6 is a schematic plan view illustrating a display device according to an embodiment. More specifically, FIG. 6 is a diagram illustrating an external shape including a window of the display device.

Referring to FIG. 6, the display device 600 may include a display region 610 and a peripheral region 620. The display region 610 may indicate a region in which visual information is displayed, and the peripheral region 620 may indicate an opaque region disposed on both sides and/or both ends of the display region 610. For example, the peripheral region 620 may correspond to a light-shielding part or a bezel part of the display device 600.

According to an embodiment, the above-described antenna laminates 100, 400 and 500 may be mounted on the display device 600. For example, the radiators 310 and the transmission lines 320 of the antenna laminates 100, 400 and 500 are disposed so as to at least partially correspond to the display region 610 of the display device 600, and the pad electrodes 330 may be disposed so as to correspond to the peripheral region 620 of the display device 600. In this case, a portion of the transmission line 320 may be disposed so as to correspond to the peripheral region 620 of the display device 600.

Driving circuits such as an IC chip of the display device 600 and/or the antenna laminates 100, 400 and 500 may be disposed in the peripheral region 620.

By arranging the pad electrodes 330 of the antenna laminates 100, 400 and 500 so as to be adjacent to the driving circuits, signal loss may be suppressed by shortening a path for transmitting and receiving signals.

When the antenna laminates 100, 400 and 500 include the dummy pattern 340, the dummy pattern 340 may be disposed so as to at least partially correspond to the display region 610 of the display device 600.

The antenna laminates 100, 400 and 500 include the radiator 310, the transmission line 320, and/or the dummy pattern 340, which are formed in the mesh structure, such that it is possible to significantly reduce or suppress the patterns from being viewed while improving the transmittance. Accordingly, image quality in the display region 610 may also be improved while maintaining or improving desired communication reliability.

According to an embodiment, the lower ground layers 140 of the antenna laminates 100, 400 and 500 may be provided as a functional layer for implementing the smart function, such as a stainless steel (SUS) plate, a heat dissipation sheet, a digitizer, an electromagnetic shielding layer, a pressure sensor, a fingerprint sensor, etc. of the display device 600. In other words, the functional layer of the display device 600 may be used as the lower ground layers 140 of the antenna laminates 100, 400 and 500. Therefore, it is possible to use the functional layer of the display device 600 as the lower ground layers 140 of the antenna laminates 100, 400 and 500 without forming a separate lower ground layer, such that mechanical design of the display device 600 or the antenna laminates 100, 400 and 500 may be easily performed.

The present invention has been described with reference to the preferred embodiments above, and it will be understood by those skilled in the art that various modifications may be made within the scope without departing from essential characteristics of the present invention. Accordingly, it should be interpreted that the scope of the present invention is not limited to the above-described embodiments, and other various embodiments within the scope equivalent to those described in the claims are included within the present invention.

EXAMPLES 1 TO 11

A 1×4 patch array antenna conductive layer using a mesh pattern made of a copper-calcium (CuCa) alloy was formed on an upper surface of a cyclo-olefin polymer dielectric layer, and an OLED panel was adhered to a lower surface of the dielectric layer. In this case, the OLED panel includes an electrode structure having a resistance of 10 Ω/sq, which is formed on a polyimide substrate film having a thickness of 50 μm.

A copper sheet having a resistance of 0.5 Ω/sq was adhered to a lower surface of the OLED panel as a lower ground layer.

In Example 1, an antenna laminate, in which the lower ground layer is directly formed on the polyimide substrate film of the OLED panel, is prepared as an example, and in Examples 2 to 11, antenna laminates, in which the lower dielectric layer (film or adhesive) is added between the electrode structure of the OLED panel and the lower ground layer to adjust a distance between the electrode structure of the OLED panel and the lower ground layer, are prepared as examples.

COMPARATIVE EXAMPLE

A 1×4 patch array antenna conductive layer using a mesh pattern made of a copper-calcium (CuCa) alloy was formed on an upper surface of a cyclo-olefin polymer dielectric layer, and an OLED panel was adhered to a lower surface of the dielectric layer.

EXPERIMENTAL EXAMPLE—EVALUATION OF ANTENNA CHARACTERISTICS DEPENDING ON A DISTANCE BETWEEN THE ELECTRODE STRUCTURE OF THE OLED PANEL AND THE LOWER GROUND LAYER

As a result of measuring antenna gains at a target frequency of 28.0 GHz for the antenna laminates prepared in Examples 1 to 11 and the comparative example, results listed in Table 1 below could be obtained.

TABLE 1

| | Distance between electrode structure of OLED panel and lower ground layer (μm) | Gain (dBi) @ 28 GHz |
|---|---|---|
| Example 1 | 50 | 8.5 |
| Example 2 | 100 | 8.0 |
| Example 3 | 125 | 7.8 |
| Example 4 | 150 | 7.6 |
| Example 5 | 300 | 7.0 |
| Example 6 | 400 | 6.7 |
| Example 7 | 500 | 6.5 |
| Example 8 | 600 | 6.3 |
| Example 9 | 700 | 6.2 |
| Example 10 | 800 | 6.1 |
| Example 11 | 900 | 5.9 |
| Comparative Example | Without lower ground layer on a lower side of the OLED panel | 4.7 |

Referring to Table 1, as the result of measuring the antenna gains at the target frequency of 28.0 GHz, it could be confirmed that the antenna laminates prepared in Examples 1 to 11 which include the lower ground layer having a low resistance exhibited excellent antenna gain characteristics, unlike the antenna laminate prepared in the comparative example which does not include lower ground layer on the lower side of the electrode structure of the OLED panel. In particular, it was confirmed that the antenna laminates prepared in Examples 1 to 10 having a thickness of 800 μm or less exhibited antenna gain satisfying 6 dBi or more.

What is claimed is:

1. An antenna laminate comprising:
   a display panel including an electrode structure;
   a dielectric layer disposed on the display panel;
   an antenna conductive layer disposed on the dielectric layer; and
   a lower ground layer disposed on a lower side of the display panel and having a lower resistance than the display panel
   wherein a distance between the electrode structure and the lower ground layer is 50 μm to 800 μm, and
   the lower ground layer is one of an SUS plate, a heat dissipation sheet, a digitizer, an electromagnetic shielding layer, and a fingerprint sensor.

2. The antenna laminate according to claim 1, further comprising: a lower dielectric layer disposed between the display panel and the lower ground layer.

3. The antenna laminate according to claim 2, wherein the lower dielectric layer has a thickness of 50 μm to 800 μm.

4. The antenna laminate according to claim 1, wherein the display panel has a resistance of 10 Ω/sq or less.

5. The antenna laminate according to claim 1, wherein the lower ground layer has a resistance of 0.5 Ω/sq or less.

6. The antenna laminate according to claim 1, further comprising:
   a first adhesive layer disposed between the antenna conductive layer and the dielectric layer; and
   a second adhesive layer disposed between the dielectric layer and the display panel.

7. The antenna laminate according to claim 1, wherein the antenna conductive layer comprises a radiator and a transmission line connected to the radiator, and
   the lower ground layer is at least partially overlapped with the radiator.

8. A display device comprising the antenna laminate according to claim 1.

* * * * *